F. B. HEDGE.
Garden-Rake.
No. 159,821.  Patented Feb. 16, 1875.
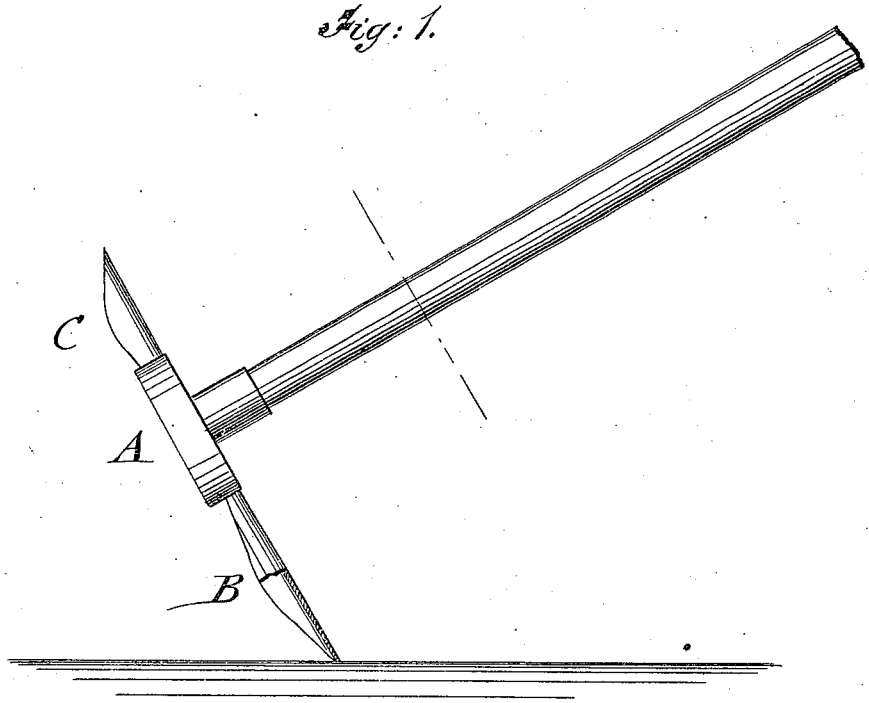
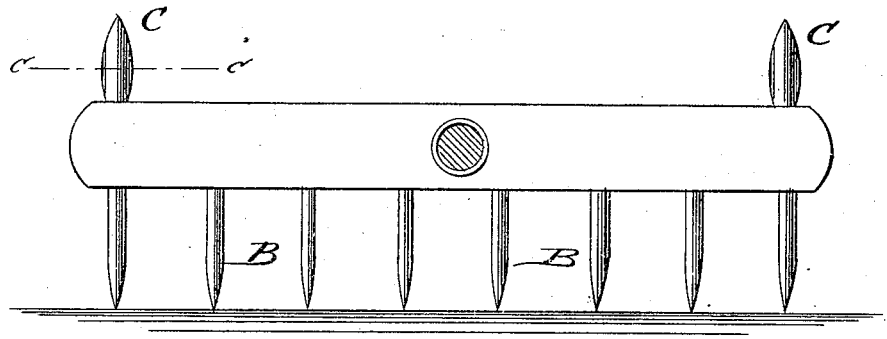
WITNESSES:  
Chas. Nida  
A. F. Terry
INVENTOR:  
F. B. Hedge  
BY  
ATTORNEYS.

UNITED STATES PATENT OFFICE.

FREDERICK B. HEDGE, OF GREENPORT, NEW YORK.

IMPROVEMENT IN GARDEN-RAKES.

Specification forming part of Letters Patent No. 159,821, dated February 16, 1875; application filed September 26, 1874.

*To all whom it may concern:*

Be it known that I, FREDERICK B. HEDGE, of Greenport, in the county of Suffolk and State of New York, have invented a new and Improved Garden-Rake, of which the following is a specification:

In the accompanying drawing, Figure 1 represents a side view of my improved garden-rake. Fig. 2 is an end view of the same; and Fig. 3 is a detail vertical transverse section on the line $c\ c$, Fig. 2, a tooth for drawing the furrows.

Similar letters of reference indicate corresponding parts.

The object of my invention is to furnish for general garden use, in preparing the ground for vegetables and other purposes, a durable and effective garden-rake, whose teeth cut the earth easily to the finer state required for planting, and facilitate the seed-dropping by producing furrows of the required depth and width. The invention consists of a garden-rake having a series of concaved teeth or tines with sharpened ends at one side, and concave and larger teeth at the other side, for being used, as required, for breaking the earth or for drawing furrows.

In the drawing, A represents the head-piece of a garden-rake, which is made, together with the teeth or tines, of malleable or other suitable material, and of the size of the common rakes. A series of teeth, B, is arranged at one side thereof, being of concave shape and sharpened at the ends, for the purpose of cutting up and powdering the earth preparatory to planting. The concave teeth are drawn through the earth with their convex sides facing the same, as indicated in Fig. 1, and act with their cutting-edges on the earth, dividing the same readily into finer parts, while the light teeth admit of an easier handling of the rake. After the earth is thoroughly broken the rake is reversed, and the upper part, which is provided with broader additional teeth C, of similar shape as teeth B, but larger size, applied to the ground for producing the furrows for the seed. The concave teeth C may be placed at a distance of about the width of the rows of vegetables as generally planted, and may be made stationary or adjustable on head A, as desired, for the purpose of obtaining a greater or lesser distance between the furrows. The short and concave shape at the larger teeth C produces the furrows quickly in the raked ground, and facilitates thus, in connection with the cutting-teeth, the preparing of the ground and the planting of seed in a superior manner to the rakes heretofore in common use.

Having thus described my invention, what I claim as new, and desire to secure by Letters Patent, is—

The garden-rake and furrowing implement herein described, consisting of the handled head A, the series of concave and end-sharpened rake-teeth B, and the larger furrowing-teeth, C, all constructed and arranged as herein shown and described.

FREDERICK B. HEDGE.

Witnesses:
THOS. PARISH,
E. S. BROWN.